United States Patent
Jeraj et al.

(10) Patent No.: US 10,263,728 B1
(45) Date of Patent: Apr. 16, 2019

(54) COMBINING TIME-VARYING NON-LINEAR DISTORTION WITH A COMMUNICATIONS SIGNAL

(71) Applicant: L-3 Communications Corp., New York, NY (US)

(72) Inventors: Janez Jeraj, Farmington, UT (US); Osama S. Haddadin, Salt Lake City, UT (US)

(73) Assignee: L-3 COMMUNICATIONS CORP., New York, NY (US)

( * ) Notice: Subject to any disclaimer, the term of this patent is extended or adjusted under 35 U.S.C. 154(b) by 441 days.

(21) Appl. No.: 14/223,369

(22) Filed: Mar. 24, 2014

(51) Int. Cl.
*H04K 3/00* (2006.01)
*H04B 1/04* (2006.01)
*H04B 1/10* (2006.01)

(52) U.S. Cl.
CPC .................. *H04K 3/41* (2013.01); *H04B 1/04* (2013.01); *H04B 1/10* (2013.01)

(58) Field of Classification Search
USPC ........ 380/35, 38–40, 46, 220; 455/1; 342/14
See application file for complete search history.

(56) References Cited

U.S. PATENT DOCUMENTS

| | | | | |
|---|---|---|---|---|
| 7,672,453 | B1 * | 3/2010 | Matolak | H04K 1/04 380/263 |
| 2005/0249266 | A1 * | 11/2005 | Brown | H04B 1/713 375/133 |
| 2009/0268783 | A1 * | 10/2009 | Karabinis | H04B 1/692 375/130 |
| 2010/0005129 | A1 * | 1/2010 | Miller | G06F 7/58 708/251 |
| 2010/0048146 | A1 * | 2/2010 | McCallister | 455/78 |
| 2011/0002463 | A1 * | 1/2011 | Michaels | H04K 1/02 380/268 |
| 2011/0051782 | A1 * | 3/2011 | Gupta | H03H 11/12 375/140 |
| 2013/0044791 | A1 * | 2/2013 | Rimini | H04B 1/109 375/219 |
| 2014/0036969 | A1 * | 2/2014 | Wyville | H04B 1/38 375/219 |

OTHER PUBLICATIONS

Shen, W., Ning, P., He, X., & Dai, H. (May 2013). Ally friendly jamming: How to jam your enemy and maintain your own wireless connectivity at the same time. In Security and Privacy (SP), 2013 IEEE Symposium on (pp. 174-188). IEEE.*

* cited by examiner

*Primary Examiner* — Zhitong Chen
(74) *Attorney, Agent, or Firm* — Kirton McConkie; Brian Tucker

(57) ABSTRACT

A transmit signal can be distorted with non-linear distortion, and one or more characteristics of the non-linear distortion can be periodically changed in accordance with a change key. The transmission received at a receiver can thus comprise a severely distorted version of the transmission of the transmit signal. A receiver with the same change key can recognize and decode the transmission, but it can be extraordinarily difficult for receivers that lack the change key to detect and decode the transmission. The transmission can be a communications while jamming (CWJ) transmission. The CWJ transmission can contain a coded message that can be decoded only by friendly RF receivers, and the CWJ transmission can also jam unfriendly RF receivers that lack a change key for decoding the coded message.

39 Claims, 8 Drawing Sheets

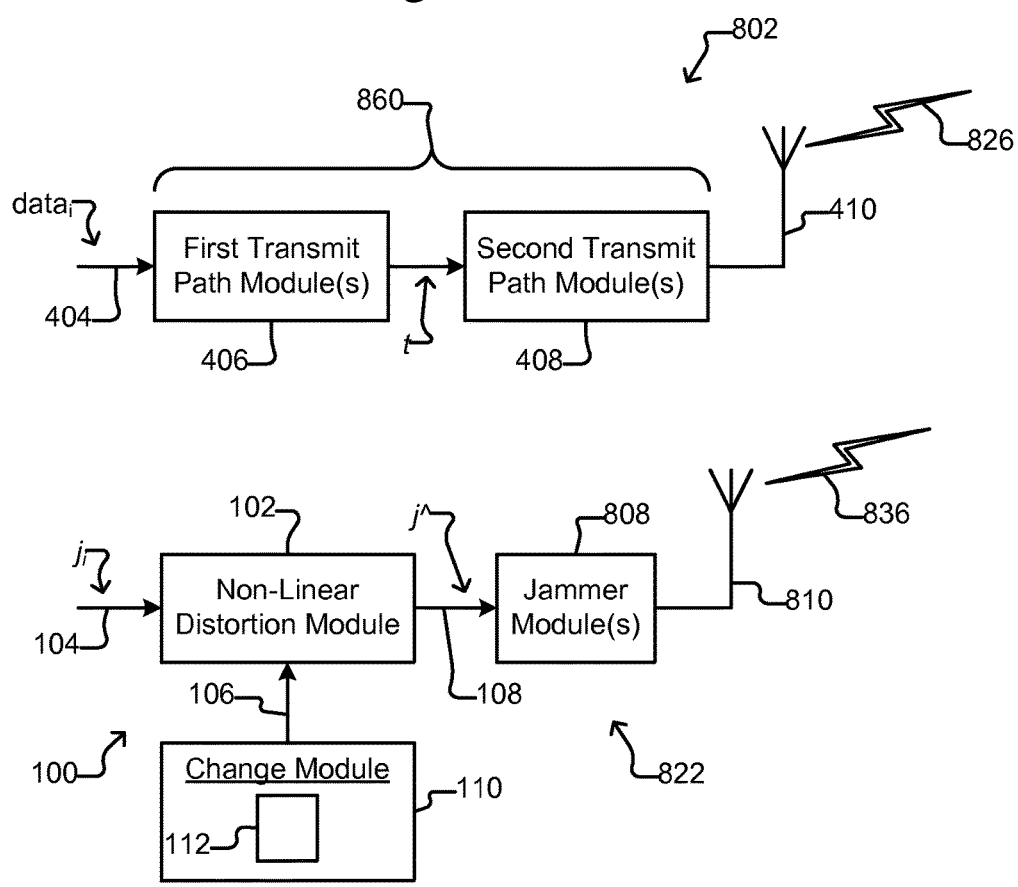

US 10,263,728 B1

COMBINING TIME-VARYING NON-LINEAR DISTORTION WITH A COMMUNICATIONS SIGNAL

BACKGROUND

Electronic communications receivers can be jammed with jamming signals. For example, jamming signals can be broadcast that interfere with communications signals received at unfriendly radio receivers. Such jamming signals, however, can also interfere with friendly receivers. Some embodiments of the present invention utilize time varying, non-linear distortion to hide a transmitted signal from unfriendly receivers. The distortion can also jam the unfriendly receivers. The distortion can cause the transmitted signal to appear non-deterministic to unfriendly receivers. Indeed, in some embodiments, the computational complexity required of an unfriendly receiver to remove the distortion can render nearly impossible the task of detecting and decoding the transmit signal. Friendly (e.g., intended) receivers, however, can remove the distortion and recognize and decode the transmitted signal. Embodiments of the invention can thus provide advanced signal protection against interception of transmitted signals by unfriendly receivers while also jamming the unfriendly receivers. These and/or other advantages and improvements are provided by some embodiments of the present invention.

SUMMARY

In some embodiments, a radio frequency (RF) communications system can include an RF transmitter, which can comprise a transmit device, a transmit path to the transmit device, a distortion module, and a change module. The transmit device can be configured to transmit an RF transmission, and the distortion module can be configured to impart non-linear distortion to a transmit signal in the transmit path to produce a distorted version of the transmit signal. The change module can be configured to change periodically (as defined herein) non-linear characteristics of the distortion module in accordance with a transmitter change key comprising a sequence of changes to the non-linear characteristics of the distortion module and a corresponding time for each change.

In some embodiments, an RF communications system can include a communications transmitter and a jamming transmitter. The communications transmitter can be configured to transmit an RF communications transmission in a frequency band, and the jamming transmitter can be configured to transmit an RF jamming transmission. The jamming transmitter can include a distortion module and a change module. The distortion module can be configured to impart non-linear distortion to an input signal to produce a distorted jamming signal, and the change module can be configured to change periodically non-linear characteristics of the distortion module in accordance with a jammer change key comprising a sequence of changes to non-linear characteristics of the distortion module and a corresponding time for each change.

In some embodiments, a communications process can include imparting non-linear distortion to a transmit signal in an RF transmitter to produce a distorted version of the transmit signal in the transmitter, and periodically changing, in accordance with a sequence of changes and corresponding times stored in a transmitter change key at the transmitter, non-linear characteristics of the non-linear distortion. The process can also include transmitting the distorted version of the transmit signal as an RF transmission from the transmitter.

In some embodiments, a communications process can include transmitting an RF communications transmission from an RF communications transmitter, and distorting an input signal in an RF jamming transmitter in accordance with a non-linear function or a non-parametric model to produce a distorted jamming signal in the jamming transmitter. The process can also include periodically changing, in accordance with a sequence of changes and corresponding times stored in a change key at the jamming transmitter, non-linear characteristics of the non-linear function or model, and transmitting the distorted jamming signal as an RF jamming transmission from the jamming transmitter.

BRIEF DESCRIPTION OF THE DRAWINGS

FIG. 8A is an example of a communications transmitter for transmitting a communications transmission and a jamming transmitter configured to transmit a jamming transmission by changing characteristics of distortion applied to a jamming input signal $j_i$ in accordance with a change key according to some embodiments of the invention.

DETAILED DESCRIPTION OF EXEMPLARY EMBODIMENTS

Figure 1:
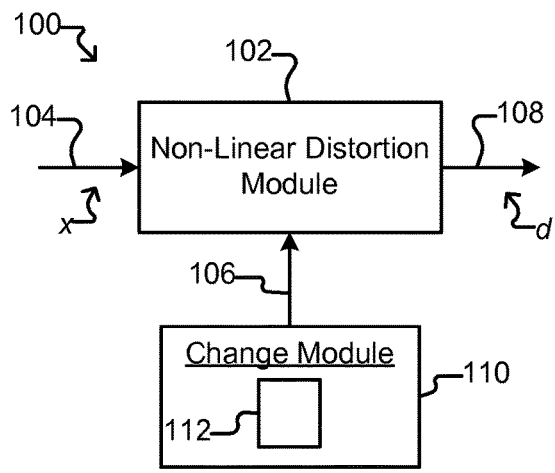
FIG. 1 illustrates an example of a variable non-linear distorter for distorting an input signal x according to some embodiments of the invention.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent. The term "ones" means more than one.

The term "periodically," as used with respect to an action or actions, means to take the action or actions repeatedly at regular or non-regular intervals (e.g., time intervals). Periodic changes can be repeating or non-repeating.

In some embodiments of the invention, a transmit signal can be distorted with non-linear distortion, and one or more characteristics of the non-linear distortion can be periodically changed in accordance with a change key. This can severely distort the transmit signal, which can make it extraordinarily difficult for an unfriendly receiver to detect and decode the transmit signal. The transmit signal can thus be effectively hidden in what appears to be transmission of random noise. In addition, in some embodiments, the transmission can effectively jam unfriendly receivers, preventing the unfriendly receivers from being able to receive any transmission. Friendly (e.g., intended) receivers, however, can utilize a receiver change key that is the same as the transmit key to recognize and decode the transmission. An application for some embodiments can thus be in a communications while jamming (CWJ) system. A CWJ transmission is a transmission containing data that can be decoded by a friendly (e.g., intended) receiver while blocking unfriendly (e.g., unintended) receivers from decoding the CWJ transmission or even being able to detect any other transmission.

FIG. 1 illustrates an example of a variable, non-linear distorter 100. As shown, the distorter 100 can comprise a non-linear distortion module 102 and a change module 110. The distortion module 102 can comprise a signal input 104, a control input 106, and an output 108. The distortion module 102 can be configured to distort an input signal x to produce a distorted output signal d (hereinafter sometimes also referred to simply as a distortion signal). The input signal x—and thus the distorted output signal d—can be in digital or analog format. Moreover, the signal x can be, in some embodiments, a continuous signal. The change module 110 can be configured to change (e.g., via the control input 106) periodically one or more characteristics of the distortion module 102—and thus the distortion applied to the input signal x—in accordance with a change key 112, which can be stored in the change module 110.

The distortion module 102 and the change module 110 can be configured physically to comprise a digital memory (not shown) and a digital processor (not shown), which can be configured to operate in accordance with machine readable instructions (e.g., software, firmware, microcode, or the like) stored in the digital memory. Alternatively or in addition, the distortion module 102 and/or the change module 110 can be configured physically as hardwired digital circuitry (not shown) and/or analog circuitry (not shown). The distortion module 102 and the change module 110 can thus be configured (e.g., by such machine readable instructions, hardwired digital circuitry, and/or analog circuitry) to perform any function, process, step of a process, operation, or the like illustrated or described herein as being performed by the distortion module 102 and/or the change module 110.

Figure 2:
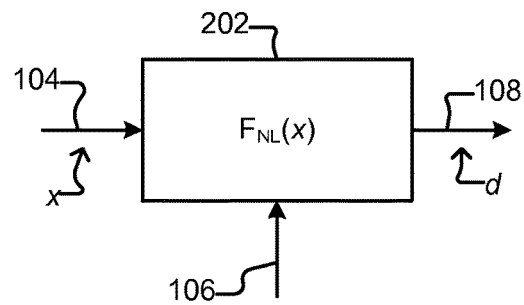
FIG. 2 shows an example in which the distorter of FIG. 1 is configured to distort the input signal x in accordance with a non-linear function $F_{NL}(x)$ according to some embodiments of the invention.
Figure 3:
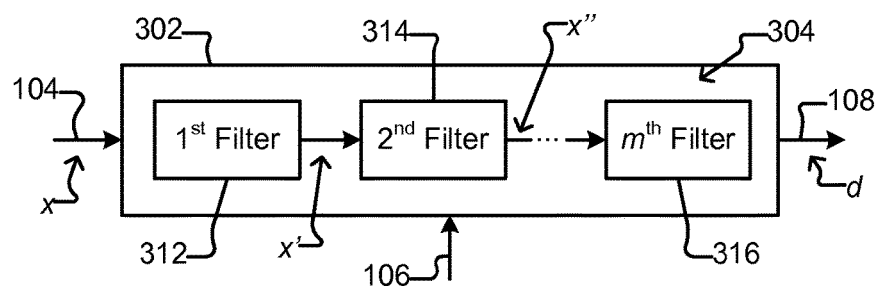
FIG. 3 is an example in which the distorter of FIG. 1 comprises a cascade of filters according to some embodiments of the invention.

FIGS. 2 and 3 illustrate examples of functional configurations of the distortion module 102. As will be seen, the example configuration 202 of the distortion module 102 illustrated in FIG. 2 can produce the distortion signal d as a non-linear function $F_{NL}$ of the input signal x. In the example illustrated in FIG. 3, the configuration 302 of the distortion module 102 comprises a cascade 304 of filters 312, 314, 316. The foregoing are examples only, and the distortion module 102 of FIG. 1 can comprise other configurations. For example, the distortion module 102 can comprise a non-parametric, non-linear model (not shown) that distorts the input signal x in accordance with the model to produce the distortion signal d. Such a model can be any non-linear system. The distortion module 102 of FIG. 1 (or any other figure herein) can thus be configured to process an input signal x to produce a distortion signal d in accordance with a non-linear function $F_{NL}(x)$, a filter configuration such as 302 in FIG. 3, or a non-linear system such as a non-parametric, non-linear model (not shown).

As mentioned, in the example of FIG. 2, the distortion module 102 can process an input signal x in accordance with a non-linear function $F_{NL}(x)$ to produce a distorted output signal d. For example, the distorted output signal d can be substantially a function of the input signal x as follows: $d=F_{NL}(x)$, wherein $F_{NL}$ is a non-linear function. The distortion module 202 is thus an example configuration of and can replace the distortion module 102 throughout the figures.

The function $F_{NL}$ can be any non-linear function. For example, the function $F_{NL}$ can be continuous, non-continuous, stepped, a combination of multiple sub-functions, and/or the like. As another example, the function $F_{NL}$ can be a memory function. Alternatively, the function $F_{NL}$ need not be a memory function. As yet another example, the function $F_{NL}$ can comprise one or more filtering or distortion functions.

In some embodiments, and as discussed below, the function $F_{NL}$ can comprise a mathematical combination of terms, and at least one of the terms can be non-linear. As one example, the function $F_{NL}$ can comprise a plurality of terms that are combined (added, multiplied, or the like) mathematically. Each such term of the function $F_{NL}$ can itself comprise a mathematical combination of one or more elements. Examples of such elements include the following: a coefficient (e.g., a numerical element), a current-value variable that corresponds to the current value of the input signal x, and/or a memory variable that corresponds to a past value of the input signal x, the distorted output signal d, an intermediate signal x', or the like. Moreover, one or more of the terms and/or elements in the function $F_{NL}$ can be raised to an exponential power p. The function $F_{NL}$ can thus comprise one or more terms that are combined mathematically; each of the terms can comprise one or more elements that are combined mathematically; each element can comprise a coefficient, a current-value variable, or a memory variable; and any of the foregoing terms or elements can be raised to a power p.

A "zero term" in the function $F_{NL}$ is a term with a coefficient whose value is zero, and a "non-zero term" is a term none of whose coefficients is zero. The "order" (also known as the "degree") of the function $F_{NL}$ is the highest power p of any element in any non-zero term. The function $F_{NL}$ is a "memory function" if one of the non-zero terms comprises a memory variable. The "memory depth" of a memory function, and thus the function $F_{NL}$, is the number of non-zero terms in the function that comprise a memory variable. The function $F_{NL}$ is a memory function if its memory depth is at least one. In some embodiments, the function $F_{NL}$ can have infinite memory depth.

An example of the function $F_{NL}$ is thus a k-term general function as follows: $F_{NL} = \text{term}_1^{p1}(\text{math function}_1)\text{term}_2^{p2}(\text{math function}_2)\text{term}_3^{p3} \ldots (\text{math function}_{k-1})\text{term}_k^{pk}$, where p1, p2, p3, and pk are integer powers greater than or equal to one; and each of math functions$_1$, math functions$_2$, and math functions$_{k-1}$ is addition, subtraction, multiplication, or division. In the foregoing each term$_1$, term$_2$, term$_3$, term$_k$ can comprise one or more elements as follows: element$_a^{pa}$(math function$_a$)element$_b^{pb}$(math function$_b$)element$_c^{pc}$ ... (math function$_{w-1}$)element$_w^{pw}$, where pa, pb, pc, and pw are integer powers greater than or equal to one; each math function$_a$, math function$_b$, and math function$_{w-1}$ is addition, subtraction, multiplication, or division; and each element$_a$, element$_b$, element$_c$, and element$_w$ comprises a numerical constant, a current-value variable, or a memory variable. As noted above, a current-value variable corresponds to the current value of an input signal x, and a memory variable corresponds to a past value of the input signal x, an output signal d, or an intermediate signal x'. One or more (e.g., all of) term$_1$, term$_2$, term$_3$, ... term$_k$ can include the current value or a past value of an input signal x, an output signal d, and/or an intermediate signal x'.

As is known, a polynomial is a special case of the foregoing type of function. That is, a polynomial comprises a plurality of terms in which the terms are combined by mathematical addition or subtraction, and the elements of all multi-element terms are combined by mathematical multiplication or division. Otherwise, a polynomial can have all of the above described features of $F_{NL}$. Another example of $F_{NL}$ is thus a k-term polynomial function, which can also be an N-depth memory function.

The distortion module 302 of FIG. 3 is another example configuration of the distortion module 102 and can replace the distortion module 102 throughout the figures. As shown, the distortion module 302 can comprise one or more filters (e.g., digital filters) 312, 314, 316. Although three filters 312, 314, 316, there can be one, two, or more than three filters. Examples of suitable filters include any filter with one or more non-linear characteristics such as non-linear polynomial filters (e.g., bilinear polynomial filters), infinite impulse response (IIR) filters, Volterra filters, or the like.

As shown in FIG. 3, the distortion module 302 can comprise m cascaded filters 312, 314, 316, where m is greater than one. For example, a first filter 312 can receive as input 104 the signal x and filter the signal x to produce a first filtered version x' of the signal x. The first filtered version x' can then be filtered by a second filter 314 to produce a second filtered version x" of the input signal x, and the second filtered version x" of the signal x can then be provided in like manner to one or more additional cascaded filters. The output of the mth filter 316 (the last filter in the cascade 304) can be output 108 from the distortion module 302 as the distortion signal d.

The m filters 312, 314, 316 can each be any of a variety of different types of linear or non-linear filters including finite impulse response (FIR) filters, IIR filters, other types of polynomial filters (e.g., bilinear polynomial filters), Volterra filters, or the like. Moreover, at least two of the m filters 312, 314, 316 can be different types of filters. In some embodiments, at least one of the filters 312, 314, 316 can be non-linear.

The cascaded configuration of the filters 312, 314, 316 in FIG. 3 is but an example, and other arrangements are possible. For example, each filter 312, 314, 316 can receive at its input the signal x, and the outputs of the filters 312, 314, 316 can be combined (e.g., added, subtracted, multiplied, or the like) to form the distortion signal d. As another example, the filters 312, 314, 316 can be arranged in part in the foregoing arrangement and in part in a cascaded arrangement.

Referring again to FIG. 1, the module 110 can be configured to periodically change one or more characteristics of the distortion module 102 in accordance with a change key 112. For example, the change module 110 can periodically change one or more non-linear characteristics of the distortion module 102 such as the order (a.k.a. degree) or memory depth of one or more functions or filters by which the distortion module 102 produces the distortion signal d from the input signal x. As another example, if the distortion module 102 is comprises a non-parametric non-linear model, the change module 110 can periodically change one or more non-linear characteristics of the model. Regardless, the change module 110 can also periodically change one or more linear characteristics of the distortion module 102.

The change key 112 can comprise, for example, a sequence of changes to be made to one or more characteristics of the distortion module 102 and times at which to make the changes. Table 1 below is an example of a change key 112 in which each row corresponds to a time and a corresponding change to be made to one or more characteristics of the distortion module 102 at the specified time. Table 1 can, for example, be stored as a digital data table in a digital memory (not shown) of the change module 110.

TABLE 1

| Time | Change Action |
|---|---|
| time$_1$ | change$_1$ |
| time$_2$ | change$_2$ |
| time$_3$ | change$_3$ |
| time$_4$ | change$_4$ |
| . | . |
| . | . |
| . | . |
| time$_{q-1}$ | change$_{q-1}$ |
| time$_q$ | change$_q$ |

The times in Table 1 can be relative to a start time such as a synchronization event or the like. The time period between each change need not be the same. Thus, for example, the time period between time$_1$ and time$_2$ can be different than the time period between time$_3$ and time$_4$. Each change action in Table 1 can be one or more specific changes to one or more linear or non-linear characteristics of the distortion module 102.

Examples of changes that the change module 110 can periodically make to the distortion module 102—and thus examples of the types of change actions that can be in the sequence of changes in the change key 112 (e.g., such as Table 1 above)—can include any one or more of the following: a change of the value of one or more of the coefficients in one or more of the terms of the function $F_{NL}$ of FIG. 2 or the filters 312, 314, 316 in FIG. 3; a change in the order (a.k.a. degree) of the function $F_{NL}$ of FIG. 2 or the filters 312, 314, 316 in FIG. 3; or a change in the memory depth of the function $F_{NL}$ of FIG. 2 or the filters 312, 314, 316 in FIG. 3. Indeed, the changes can include changes to any non-linear characteristic of the distortion module 102, which as noted can be any non-linear system including, for example, a non-parametric, non-linear model. In such a case, the changes can include changes to non-linear characteristics of the model.

Examples of change actions ($change_1$ through $change_q$ in Table 1 above) that can be taken with respect to $F_{NL}(x)$ (see Figure) include changing the value of one or more of the coefficients of the function $F_{NL}$, changing the order and/or memory depth of the function $F_{NL}$, and/or changing the type of nonlinearity of the function $F_{NL}$. Non-limiting specific examples of the foregoing are discussed below with respect to the following example of the function $F_{NL}(x(t))$ as a polynomial function comprising seven terms: $F_{NL}(x(t))=a(x(t))^6+b(x(t))^5-c(x(t-t_3))^4+d(x(t-t_1))^3-e(x(t-t_2))^2+f\ x(t)+C$, where C is a numerical value and a, b, c, d, e, and f are coefficients. The expression x(n) is the value of the input signal x at time n. The expression x(t) refers to the current value of the input signal x, and the expression $x(t-\tau)$ is the value of the input signal x $\tau$ in the past (e.g., the value of the input signal x at a time period T prior to the current time t. For example, if the input signal x comprises digitized samples of an analog signal, x(t) can be the value of the current sample (e.g., the sample at the input 104) and $x(t-\tau)$ can be the value of the sample $\tau$ samples before the current sample. A term with a non zero value of T is thus a memory term, and in the example above, the terms $c(x(t-t_3))^4$, $d(x(t-t_1))^3$, and $e(x(t-t_2))^2$ are thus memory terms in which the value of x three time periods (e.g., samples), one time period, and two time periods, respectively, prior to the current value of x are used.

With reference to the foregoing example of $F_{NL}(x(t))$, changing the value of one or more coefficients can comprise changing the value of one or more of coefficients a, b, c, d, e, and/or f. As will be seen, changing the values of one or more of those coefficients from zero to a non-zero value or from a non-zero value to zero can change the order, the memory depth, and/or the type of nonlinearity of the function For example, changing the order (a.k.a. degree) of the function $F_{NL}(x(t))$ can comprise changing one or more of the coefficients a, b, c, d, e, and/or f to or from zero to thereby change the greatest power to which an element in a non-zero term is raised. For example, if the value of the coefficient a is not zero, the degree of the function $F_{NL}(x(t))$ is six. If the value of b is zero but the value of c is not, the degree of the function $F_{NL}(x(t))$ can be changed from six to four by changing the coefficient a to zero. Continuing with the foregoing example in which the value of the coefficients a and b are zero, the degree of the function $F_{NL}(x(t))$ can be further changed from four to three by changing the value of the coefficient c to zero and changing the value of the coefficient d to a non-zero value (assuming the coefficient d was zero). Continuing further with the foregoing example in which the values of the coefficients a, b, and c are zero, the degree of the function $F_{NL}(x(t))$ can then be changed to five by changing the value of the coefficient b to a non-zero value.

Changing the memory depth of the function $F_{NL}(x(t))$ can comprise changing one or more of the coefficients c, d, and/or e of the memory terms to or from zero. For example, if the coefficients c, d, and e are set to non-zero values, the memory depth of $F_{NL}(x(t))$ is three because all three memory terms are non-zero. The memory depth, however, can be changed from three to one, for example, by changing two of the coefficients c, d, and e to zero. As another example, the memory depth of $F_{NL}(x(t))$ can then be changed to two by changing one of the coefficients c, d, or e that was set to zero in the previous example to a non-zero value. As yet another example, the memory depth of $F_{NL}(x(t))$ can be changed to zero by setting all of the coefficients c, d, and e to zero.

In short, examples of the change actions in Table 1 above include the following: a coefficients change action that identifies one or more coefficients of the function $F_{NL}$ and values to which each of the identified coefficients is to be changed; an order change action that identifies one or more coefficients of the function $F_{NL}$ or an exponent associated with the input signal x, the output signal d, or an intermediate signal x' that are to be changed to zero or from zero to a specifically identified non-zero value; and a memory depth change action that identifies one or more coefficients of the function $F_{NL}$ of a memory term that are to be changed to zero or from zero to a specifically identified non-zero value. Thus, per the change key 112, the change module can repeatedly change values of one or more coefficients, the order (a.k.a. the degree), the memory depth, and/or the nonlinear function structure of the function $F_{NL}(x)$ of FIG. 2 and can likewise repeatedly make such changes to the filtering functions of one or more of the filters 312, 314, 316 of FIG. 3.

The change key 112 is illustrated in Table 1 above as a table of fixed times and corresponding change actions. The change key 112 can instead be dynamic. For example, the change module 110 of FIG. 1 can comprise a plurality of different change keys (each similar to the change key 112), and one of those change keys can be selected at any given time. The change module 110 can provide control input 106 to the distortion module 102 in accordance with the selected change key but not the other change keys. In some embodiments, the selected one of the change keys can periodically be changed, for example, in accordance with a secondary change key (not shown). As yet another example, the contents of the change key 112 can be changed, for example, in accordance with a secondary change key (not shown). A receiving device (not shown in FIG. 1) can undo the distortion d as long as the receiving device has the same change key 112, whether the change key 112 is static or dynamic.

The variable non-linear distorter 100 can thus severely distort the input signal x, which can be a deterministic signal. Moreover, the sequence of changes to characteristics of the distortion module 102 in the change key 112 (e.g., Table 1 above) stored in the change module 110 can cause the distortion signal d output by the distortion module 102 to be unrecognizable as a deterministic signal but rather appear to be random noise. An example of an application for the distorter 100 of FIG. 1 (including the variations of the distortion module 102 shown in FIGS. 2 and 3 and/or discussed above) is in a communications system for transmitting radio frequency (RF) signals carrying data. FIGS. 4, 5, 8A, and 8B illustrate examples of such communications systems. Any mention or reference herein to the distortion module 102 includes the distortion module 102 configured as shown in FIG. 2 or FIG. 3 or as discussed above.

Figure 4:
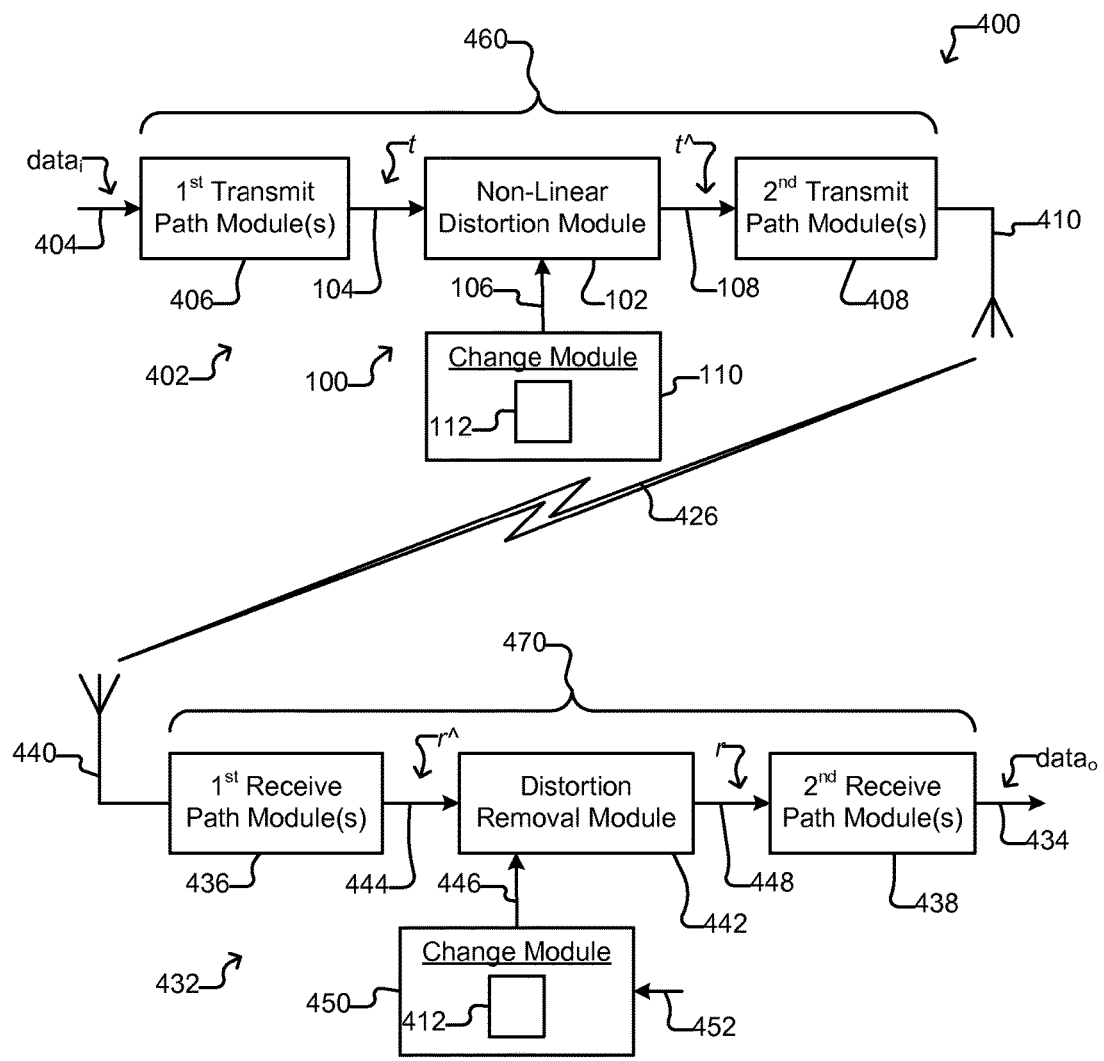
FIG. 4 shows an example of a communications system in which a transmitter changes characteristics of distortion applied to a transmit signal t in accordance with a change key, and a receiver has the same change key according to some embodiments of the invention.

FIG. 4 illustrates an example of a radio frequency (RF) communications system 400, which as shown, can comprise an RF transmitter 402 and an RF receiver 432. The transmitter 402 can include the variable, non-linear distorter 100 of FIG. 1, and the receiver 432 can include a distortion removal module 442 and a change module 450 with a receiver change key 412 that corresponds to (e.g., is the same as or the inverse of) the change key 112 in the transmitter 402. (Hereinafter the change key 112 in the transmitter 402 is sometimes referred to as the change key 112 to distinguish from the receiver change key 412.) The transmitter 402 can thus severely distort a transmit signal t and transmit the resulting distorted transmit signal t^.

In some embodiments, the resulting transmission 426 can be so severely distorted (e.g., due to the changes specified in the transmitter change key 112) that the transmission 426 appears to be random noise rather than a deliberate transmission. For example, the transmission 426 can be a communications while jamming (CWJ) transmission, which can be decoded by (e.g., only by) an RF receiver (e.g., 432) that has a receiver change key (e.g., 412) that corresponds to the transmitter change key (e.g., 112) but effectively jams RF receivers that lack such a receiver change key. In the example shown in FIG. 4, because the receiver 432 has a receiver change key 412 that corresponds to the transmitter change key 112, the receiver 432 can substantially remove the distortion intentionally introduced by the distortion module 102 from a distorted receive signal r^ (corresponding to the transmission 426 received at the receiver 432) to produce a receive signal r that should be substantially the same as the transmit signal t. Nevertheless, whether the transmitter change key 112 is static or dynamic (as discussed above), as long as the receiver 432 has a corresponding receiver change key 412, the receiver 432 can substantially remove the distortion intentionally introduced by the distortion module 102 from the distorted receive signal r^. It can be effectively impossible (or highly improbable) for a receiver that lacks a corresponding receiver change key 412 to remove the distortion.

The receiver change key 412 can be provided to the receiver 432 by any means. For example, the receiver change key 412 can be received at the receiver 432 over a secure channel (not shown) from the transmitter 402. As another example, the receiver change key 412 can be loaded directly into the receiver 432. Although one transmitter change key 112 and one receiver change key 412 are shown in FIG. 4, there can be multiple different transmitter change keys 112 stored at the transmitter 402 and multiple corresponding receive change keys 412 stored at the receiver 432. The transmitter 402 can select one of its transmitter change keys 412 and signal the receiver 432 which of its receiver change keys 412 to use. During operation of the communications system 400, the transmitter 402 can periodically change the selected transmitter change key 412 and signal the receiver 432 the identity of the newly selected change key 112, which the receiver 432 can use to select a corresponding new receiver change key 412.

As shown in FIG. 4, the transmitter 402 can comprise an input 404, a transmit device 410 (e.g., an RF antenna), and a transmit path 460 from the input 404 to the transmit device 410. The transmit path 460 can include, for example, one or more first transmit path modules 406, the distortion module 102, and one or more second transmit path modules 408. The first transmit module(s) 406 can process input data$_i$ received at the input 404 and produce a transmit signal t that contains the data$_i$. The transmit signal t can be in digital format or analog format.

As also shown, the transmit signal t can be provided to the signal input 104 of the distortion module 102, which can distort the transmit signal t to produce a distorted transmit signal t^ at the output 108 while the change module 110 periodically changes, in accordance with the transmitter change key 112, characteristics (including non-linear characteristics) of the distortion module 102 as discussed above with respect to FIGS. 1-3. Distorting the transmit signal t to produce the distorted transmit signal t^ can be an example of "imparting distortion" to the transmit signal t. The second transmit module(s) 408 can then further process the distorted transmit signal t^ and drive the distorted transmit signal t^ onto the transmit device 410, which can transmit the distorted transmit signal t^ as an RF transmission 426.

As example, the first transmit path module(s) 406 can include modules for error correction encoding, modulation, digital filtering, and/or the like. As an example, the second transmit path module(s) 408 can include digital pre-distortion modules, digital-to-analog converters, filters (e.g., analog), frequency converters, amplifiers, and the like.

Similar to the input signal x in FIGS. 1-3, the transmit signal t can be a recognizable deterministic signal containing the input data$_i$. As discussed above with respect to FIGS. 1-3, periodic changes to the distortion module 102 characteristics made by the change module 110 in accordance with the transmitter change key 112 can so severely and randomly distort the transmit signal t that it can be effectively impossible to remove the distortion from the resulting distorted transmit signal t^—and thus the transmission 426—and recover the transmit signal t without the corresponding receiver change key 412. In fact, in some embodiments, it can be difficult even to distinguish the transmission 426 from noise and thus identify the transmission 426 as a deliberate transmission without the receiver change key 412.

With reference still to FIG. 4, the receiver 432 can comprise a receive device 440 (e.g., an RF antenna), an output 434, and a receive path 470 from the receive device 440 to the output 434. The receive path 470 can include, for example, one or more first receive path modules 436, a distortion removal module 442, and one or more second receive path modules 438. The first receive path module(s) 436 can process the transmission 426 received at the receive device 440 and produce a distorted receive signal r^, which may be similar to the distorted transmit signal t^ transmitted by the transmit device 410 as the transmission 426. The distorted receive signal r^ can be in digital or analog format.

Unwanted distortion and noise in the transmitter 402 and the transmission path between the transmit device 410 and the receive device 440 can alter the transmission 426, and it is thus possible that the transmission 426 as sent from the transmitter 402 is not the same as the transmission 426 as received at the receiver 432. The receive signal r thus might not be the same as the transmit signal t. Although not shown, the modules 436, 438 in the receiver 432 can include components (such as are known in the field) to mitigate such unwanted distortion and noise.

As shown, the distorted receive signal r^ can be provided to the input 444 of the distortion removal module 442, which can be configured to perform the inverse of the distortion module 102 and thus remove the distortion from the distorted receive signal r^. The change module 450 can control (e.g., via the control input 446) the distortion removal module 442 in accordance with the receiver change key 412, which can be the same as or, in some embodiments, an inverse of the transmitter change key 112. The distortion removal module 442 can thus be configured to substantially remove the distortion d from the distorted receive signal r^ to produce a substantially undistorted version of the receive signal r in accordance with the receiver change key 412. The second receive module(s) 438 can further process and extract from the receive signal r output data$_o$ which should be substantially similar to the input data$_i$.

As shown, a synchronization signal 452 can be provided to the receiver 432 (e.g., to the change module 450 as shown, the distortion removal module 442, or the like). The synchronization signal 452 can be provided, for example, via a secure channel (not shown) between the transmitter 402 and the receiver 432, as a pilot segment in the transmission 426, or the like. As another example, the synchronization signal 452 can be generated in the receiver 432 from data obtained from global positioning satellites or the like.

The first receive path module(s) 436 can include diplexers, amplifiers, filters (e.g., digital and/or analog), frequency converters, analog-to-digital converters, and/or the like. The second transmit receive module(s) 438 can include digital filters, demodulators, symbol-to-bit demappers, error correction decoding, and/or the like.

Figure 5:
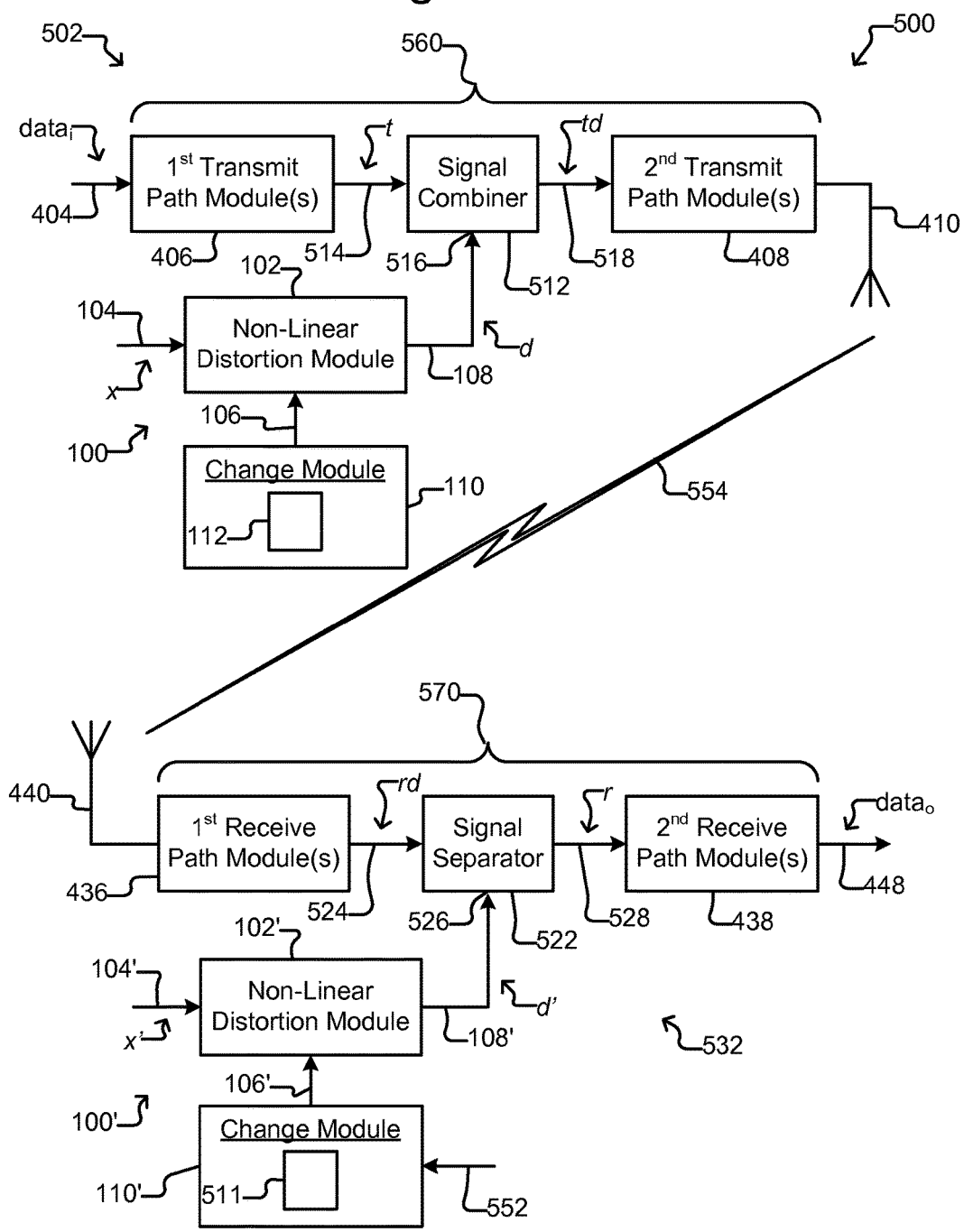
FIG. 5 illustrates an example of a communications system in which a transmitter changes characteristics of distortion that is combined with a transmit signal t in accordance with a change key, and a receiver has the same change key according to some embodiments of the invention.

FIG. 5 illustrates another example of a radio frequency (RF) communications system 500, which can in some ways be similar to the communications system 400 of FIG. 4. Elements of the system 500 can be the same as like numbered and lettered elements in FIG. 4.

As illustrated in FIG. 5, the transmit path 560 of a transmitter 502 from the input 404 to the transmit device 410 can comprise a signal combiner 512. As also shown, the variable, non-linear distorter 100 can distort an input signal x at its input 104 to produce a distortion signal d (as discussed above with respect to FIGS. 1-3). The signal x can be can be a version (e.g., a modulated version) of the transmit signal t. Alternatively, the signal x can be any type of signal such as a multitone, chirp, random or pseudo-random noise, or the like signal. The signal combiner 512 can combine the transmit signal t with the distortion signal d to produce a distorted transmit signal td, which can be further processed by the second transmit path module(s) 408 and transmitted by the transmit device 410 as a transmission 554. Combining the transmit signal t with the distortion signal d to produce the distorted transmit signal td can be an example of "imparting distortion" to the transmit signal t.

As shown, the signal combiner 512 can comprise signal inputs 514, 516 and an output 518. The signal combiner 512 can be an electronic device (e.g., an electronic circuit, programmed processor, and/or the like) configured to combine the transmit signal t at one signal input 514 with the distortion d at the other signal input 516 and output the combined signal td at the output 518. The signal combiner 512 can combine the transmit signal t with the distortion signal d by, for example, adding, subtracting, multiplying, and/or dividing the transmit signal t and the distortion signal d. The distorted transmit signal td can thus be a mathematical combination of the transmit signal t and the distortion signal d. For example, the distorted transmit signal td can be a mathematical sum, difference, or product of the transmit signal t and the distortion signal d.

Generally in accordance with the discussion above of FIGS. 1-3, because of the periodic changes to characteristics of the distortion module 102 made by the change module 110 in accordance with the change key 112, the distortion signal d can be severe distortion and can appear to be random. The distorted transmit signal td—and thus the transmission 554—can thus be so severely and appearing randomly distorted that it can be effectively impossible to remove the distortion signal d component and recover the transmit signal t without a receiver change key 511 that corresponds to (e.g., is the same as) the transmitter change key 112. Indeed, as noted, in some embodiments, it can be difficult even to distinguish the transmission 554 from noise and thus identify the transmission 554 as a deliberate transmission without such a receiver change key 511. For example, generally as discussed above, the transmission 554 can be a CWJ transmission, which can be decoded by (e.g., only by) a RF receiver (e.g., 532) that has a receiver change key (e.g., 511) that corresponds to the transmit change key (e.g., 112) but effectively jams RF receivers that lack such a receiver change key. With the receiver change key 511, the change module 110' (which can be like the change module 110) can decode the transmission 554 and extract the output data$_o$ as discussed above.

Figure 6:
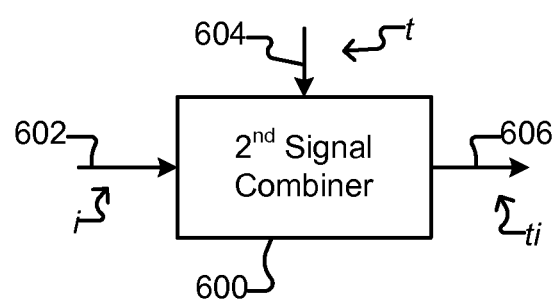
FIG. 6 is an example of a signal combiner configured to produce an input signal to the non-linear distorter of FIG. 5 by combining the transmit signal t and an input signal i according to some embodiments of the invention.

The input signal x provided to the input of the distortion module 102 can be any signal. For example, the input signal x can be a randomly generated signal, a periodic signal, or the like. As another example, the input signal x can be generated from other signals. FIG. 6 illustrates an example in which a second signal combiner 600 (which can, in some embodiments, be included in the transmitter 502 of FIG. 5) generates the input signal x from the transmit signal t and a second input signal i. The second signal combiner 600 can be generally the same as or similar to the signal combiner 512 of FIG. 5. For example, the second signal combiner 600 can mathematically combine signals at its inputs 602, 604 and provide the resulting combined signal at its output 606. For example, the second signal combiner 600 can, for example, add, subtract, and/or multiply, signals at the inputs 602, 604, and the signal at the output 606 can thus be a mathematical sum, difference, product, or the like of the signals at the inputs 602, 604.

If the second signal combiner 600 is included in the transmitter 502 of FIG. 5, input 604 can be connected to the transmit path 560 between the first transmit path module(s) 406 and the signal combiner 512 and thus receive the transmit signal t as shown in FIG. 6. The output 606 of the second signal combiner 600 can be connected to the signal input 104 of the distortion module 102 and thus provide the combined signal ti as the input signal x to the distortion module 102 in FIG. 5. In some embodiments, the input signal x in FIG. 5 can thus be the transmit signal t combined with an input signal i.

Figure 7:
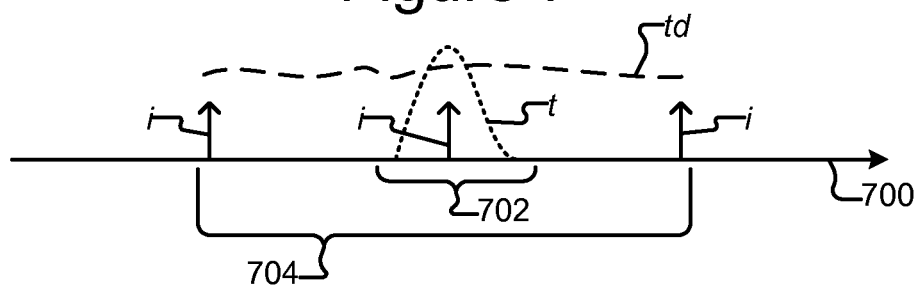
FIG. 7 shows an example frequency plot of the transmit signal t, the input signal i, and a resulting distorted transmit signal td according to some embodiments of the invention.

The input signal i can be any of many different types of signals. For example, the input signal i can comprise noise, chirps, multiple tones, or the like. As illustrated in FIG. 7, the input signal i can comprise signal components that are inside and/or outside of the frequency band 702 of the transmitter 502.

FIG. 7 illustrates a frequency axis 700 with frequency values increasing from left to right. The frequency band 702 in which the transmit signal t is intended to be transmitted is identified as frequency band 702. As shown, although the transmit signal t can be located substantially in the frequency band 702, the input signal i can include components that are in a second frequency band 704. As shown in FIG. 7, the second frequency band 704 can include the frequency band 702 of the transmit signal t and frequencies outside of the frequency band 702. The second frequency band 704 can thus include but be wider than the frequency band 702.

As also shown in FIG. 7, the resulting distorted transmit signal td can be spread over a segment of the frequency axis 700 that is outside and greater than the frequency band 702. For example, the resulting distorted transmit signal td can be spread over the second frequency band 704, which can be greater (e.g., two, three, four, five, or more times greater) than the frequency band 702. In the foregoing example, the transmitter 502 and the receiver 532 can be configured to operate over the frequency band 704. The distorted transmit signal td—and thus the transmission 554 in FIG. 5—can thus appear to be a generally flat featureless transmission that resembles noise rather than a deliberate transmission. Generally as noted, the foregoing can make it difficult for a receiver that lacks the same change key 112 to recognize the transmission 554 as a deliberate transmission of a deterministic signal much less extract the deterministic signal from the transmission 554. Also, the transmission 554 can effectively jam receivers that lack the same change key 112, while receivers that have the same change key 112 can detect and decode the transmission 554.

The depiction in FIG. 7 is but an example. For example, the input signal i can include components inside the frequency band 702 and additional components that are only greater than or only less than the frequency band 702. In other examples, the input signal i includes components that are only in the frequency band 702. In such embodiments, the content of the input signal i can be sufficient to produce a combined signal td that occupies entirely at least the frequency band 702.

Returning to FIG. 5, the receiver 532 in the communications system 500 of FIG. 5 can be generally similar to the receiver 432 in FIG. 4. As shown, however, the receive path 570 of the receiver 532 of FIG. 5 from the receive device 440 to the output 448 can comprise a signal separator 522. As also shown, the receiver 532 can include a variable, non-linear distorter 100' that can be essentially the same as the non-linear distorter 100 in the transmitter 502. For example, the non-linear distortion module 102' can distort an input signal x' received at its input 104' and output a distortion signal d' at its output 108'. The change module 110' can change characteristics of the distortion module 102' in accordance with the receiver change key 511, which as discussed above, can be the same as the transmitter change key 112. The distortion module 102', change module 110', input signal x', and distortion signal d' can be substantially the same as their counterparts in the transmitter 502 or their inverses, depending on the type of combining in the transmitter 502.

The first receive module(s) 436 in the receiver 532 can process the transmission 554 received at the receive device 440 and produce a distorted receive signal rd, which should be substantially similar to the distorted transmit signal td transmitted by the transmit device 410 as the transmission 554 (subject to unwanted distortion and noise introduced into the transmission 554 by the transmitter 502 and/or the path between the transmit device 410 and the receive device 440 as discussed above). The distorted receive signal rd can be in digital or analog format.

As shown, the distorted receive signal rd can be provided to an input 524 of the signal separator 522, and the distortion signal d' from the distortion module 102' can be provided to another input 526 of the signal separator 522, which can be configured to perform the inverse or opposite function as the signal combiner 512 in the transmitter 502. Thus, for example, if the signal combiner 512 in the transmitter 502 added the distortion d to the transmit signal t, the signal separator 522 in the receiver 532 can subtract the distortion d' from the distorted receive signal rd. As another example, if the signal combiner 512 in the transmitter 502 multiplied the distortion d by the transmit signal t, the signal separator 522 in the receiver 532 can divide the distorted receive signal rd by the distortion signal d'.

The signal separator 522 in the receiver 532 can thus substantially remove the distortion d from the distorted receive signal rd to produce the receive signal r, which should be substantially the same as the transmit signal t. As discussed above with respect to FIG. 4, the second receive path module(s) 438 can further process and extract data$_o$ from the receive signal r, and the data$_o$ should be substantially the same as the input data$_i$.

Figure 8B:
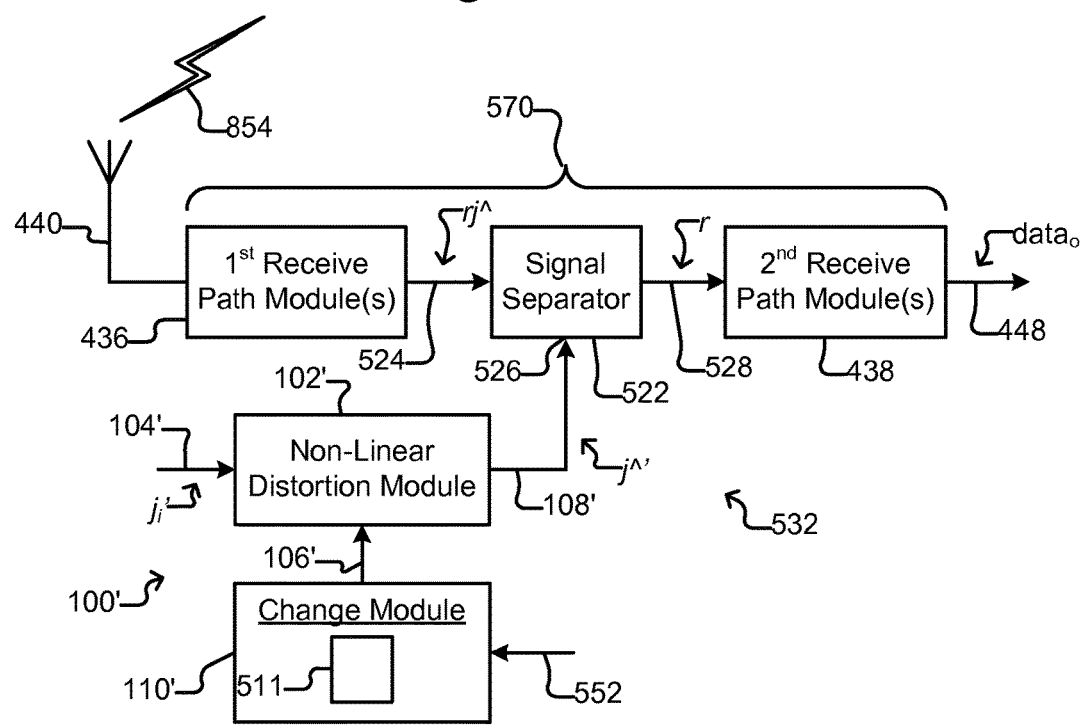
FIG. 8B is an example of a receiver with the same change key according to some embodiments of the invention.

FIGS. 8A and 8B illustrate yet another example of use of the non-linear distorter 100 of FIGS. 1-3 in a communications system. FIG. 8A illustrates an example of a communications transmitter 802 and a jamming transmitter 822. Like numbered and lettered elements in FIGS. 1, 4, 8A, and 8B can be the same.

The transmitter 802 can be generally similar to the transmitter 402 of FIG. 4, and like numbered elements can be the same. Thus, for example, the first transmit module(s) 406 can process input data$_i$ received at the input 404 and produce a transmit signal t that contains the data$_i$. The second transmit module(s) 408 can then further process the transmit signal t, and the transmit device 410 can transmit the transmit signal t as a communications transmission 826.

As also shown in FIG. 8A, a jamming transmitter 822 can comprise the distorter 100 of FIGS. 1-3, one or more jammer module(s) 808, and a transmit device 810 (e.g., an RF antenna). A jamming input signal j$_i$ can be provided to the input 104 of the distortion module 102, which can distort the jamming input signal j$_i$ to produce a distorted jamming signal ĵ at the output 108 of the distortion module 102 while the change module 110 periodically changes characteristics (including non-linear characteristics) of the distortion module 102 in accordance with the change key 112 as discussed above with respect to FIGS. 1-3. The distorted jamming signal ĵ can be in analog or digital format. The jammer module(s) 408 can further process the distorted jamming signal ĵ and the transmit device 810 can transmit the distorted jamming signal ĵ as a jamming transmission 836.

The communications transmitter 802 and the jamming transmitter 822 can be in sufficiently close proximity that the communications transmission 826 and the jamming transmission 836 combine as those transmissions propagate to a receiver 532, an example of which is illustrated in FIG. 8B. Alternatively, the communications transmitter 802 and the jamming transmitter 822 can be connected to the same transmit device (e.g., one of the transmit device 410 or 810). For example, the output of the jammer module(s) 808 in FIG. 8A can be connected to the transmit device 410 rather than 810. Regardless, a combined transmission 854 comprising the communications transmission 826 and the jamming transmission 836 can be received at a receiver 532 as shown in FIG. 8B.

With reference still to FIG. 8A, in some embodiments, the jamming transmitter 822 can transmit the jamming transmission 836 with greater power than the communications transmitter 802 transmits the communications transmission 826. For example, the jamming transmitter 822 can transmit the jamming transmission 836 with two, three, four, five, or more times the power that the communications transmitter 802 transmits the communications transmission 826. The jamming transmission 836 can thus overpower the communications transmission 826, and the communications transmission 826 can be effectively hidden in the combined transmission 854 received at the receiver 532. Indeed, because the change key 112 in the jamming transmitter 822 periodically changes characteristics of the distortion module 102 in accordance with the change key 112 as the distortion module 102 distorts the jamming input signal $j_i$, the distorted jamming signal ĵ—and thus the jamming transmission 836 and the combined transmission 854—can appear as random noise rather than a deliberately transmitted signal. In fact, the combined transmission 854 can jam any receiver that lacks a receiver change key 511 that corresponds to the change key 112. In contrast, a receiver that has the receiver change key 511 can receive the combined transmission 854 and separate the communications transmission 826 from the jamming transmission 836. FIG. 8B illustrates an example of a receiver 532 configured to do so.

The receiver 532 shown in FIG. 8B can be the receiver illustrated in FIG. 5 and discussed above. As illustrated in FIG. 8B, however, the receiver 532 can receive the combined transmission 854. The first receive module(s) 436 can process the combined transmission 854 received at the receive device 440 and produce a combined received signal rĵ (which can be in analog or digital format), which can comprise a received signal r that should be substantially similar to the transmit signal t transmitted as the communications signal 426 and the distorted jamming signal ĵ (subject to unwanted distortion and noise introduced into the transmissions 826, 836 and thus the combined transmission 854 by the communications transmitter 802, the jamming transmitter 822, and/or the path between the transmit devices 410, 810 and the receive device 440 as discussed above).

As shown, the combined received signal rĵ can be provided to the input 524 of the signal separator 442, and the distorted jamming signal ĵ ' from the distortion module 102' can be provided to another input 526 of the signal separator 522, which can be configured to separate the received signal r from the combined receive signal rĵ. For example, the signal separator 522 can subtract the distorted jamming signal ĵ ' generated by the distortion module 102' from the combined received signal rĵ to produce the receive signal r at the output 528. The signal separator 522 in the receiver 532 can thus remove the distorted jamming signal ĵ ' from the combined receive signal rĵ and output 528 the receive signal r, which can be substantially the same as the transmit signal t transmitted in the communications transmission 826 by the communications transmitter 802 of FIG. 8A. As discussed above with respect to FIG. 4, the second receive path module(s) 438 can further process and extract $data_o$ from the receive signal r, and the $data_o$ can be substantially the same as the input $data_i$.

The jamming input signal $j_i$ provided to the input 104 of the distortion module 102 in the jamming transmitter 822 and a similar jamming input signal $j_i'$ provided to the input 104' of the distortion module 102' in the receiver 532 can be any of many different types of signals. For example, the jamming input signal $j_i$ (and $j_i'$) can comprise noise, chirps, multiple tones, or the like. As another example, the jamming input signal $j_i$ (and $j_i'$) can, like the input signal i of FIG. 6, comprise signal components that are inside and/or outside of the frequency band in which the transmitter 802 transmits the transmit signal t and thus the communications transmission 826. The jamming input signal $j_i$ (and $j_i'$) can thus be the same as or similar to the input signal i (e.g., as illustrated in FIG. 7) as discussed above, and the combined receive signal rĵ—and thus the combined transmission 854—can have any of the properties of the distorted transmit signal td shown in FIG. 7 and discussed above.

The systems and configurations illustrated herein are examples, and variations are contemplated. For example, features of the systems 400 and 500 can be combined. As one example, a distortion module 102 connected to a change module 110 can be disposed between the first transmit path module(s) 406 and the signal combiner 512 of FIG. 5. The foregoing can produce the distorted transmit signal t̂ as discussed above with respect to FIG. 4, which can be provided as an input to the signal combiner 512 in FIG. 5. In such an embodiment, the distortion module 102 and change module 110 shown in FIG. 5 can produce the distortion signal d as discussed above with respect to FIG. 5, which the signal combiner 512 can combine with the distorted transmit signal t̂ to produce a doubly distorted transmit signal t̂ d that is further processed by the second path module(s) 408 and transmitted by the transmit device 410.

The transmitter 502 can thus include at least two instances of the distortion module 102 and the change module 110, which can be the same or different. The receiver 532 can be correspondingly modified to include the distortion removal module 442 and change module 450 of FIG. 4.

The communications transmitter 802 of FIG. 8A can likewise be modified to include features of the communications systems 400 and/or 500. For example, the transmitter 802 of FIG. 8A can alternatively be configured like the transmitter 402 of FIG. 4 and/or the transmitter 502 of FIG. 5 and thus impart distortion d to the transmit signal t generally as discussed above with respect to FIGS. 4 and 5. The receiver 532 of FIG. 8B can be similarly modified to remove such distortion d generally as discussed above with respect to FIGS. 4 and 5.

Figure 9A:
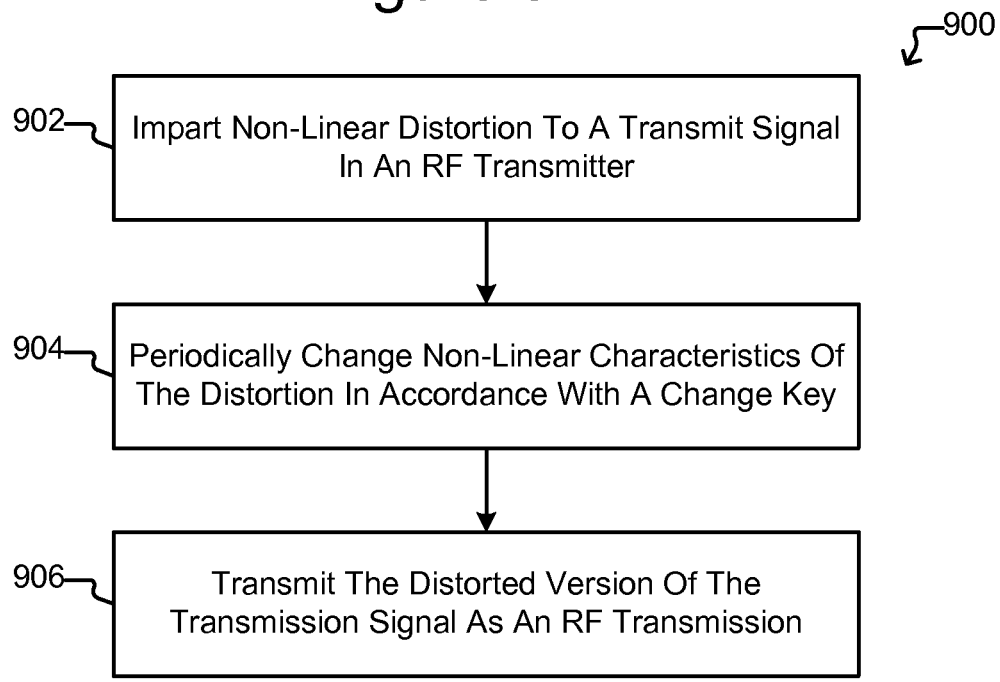
FIG. 9A shows an example of a process that includes transmitting a distorted version of a transmit signal.
Figure 9B:
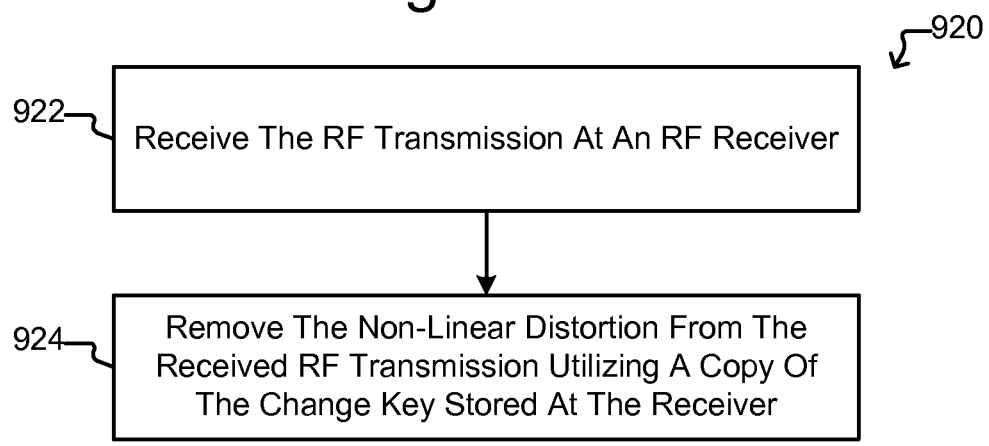
FIG. 9B is an example of a process for receiving and decoding the distorted transmit signal according to some embodiments of the invention.

FIGS. 9A and 9B illustrate examples of processes 900, 920 for transmitting an RF transmission signal comprising a transmit signal distorted in accordance with a change key and utilizing the same change key to remove the distortion at an RF receiver. Although the processes 900, 920 are not so limited, the communications systems of FIGS. 4 and 5 (including any modification or alternative illustrated or mentioned herein) can perform the processes 900, 920.

The process 900 of FIG. 9A can be performed by the transmitter 402 of FIG. 4 or the transmitter 502 of FIG. 5.

As shown, at step 902, the process 900 can impart non-linear distortion to a transmit signal in an RF transmitter. For example, the distortion module 102 of FIG. 4 can distort the transmit signal t to produce the distorted transmit signal t̂ as discussed above. As another example, the distortion module 102 of FIG. 5 can produce the distortion signal d, and the signal combiner 512 can combine the distortion signal d with the transmit signal t to produce the distorted transmit signal td as discussed above.

At step 904, the process 900 can periodically change non-linear characteristics of the distortion imparted at step 902, and the process 900 can do so in accordance with a change key at a transmitter. For example, the transmit change module 110 of FIG. 4 can periodically change characteristics of the distortion module 102—and thus the distortion imparted to the transmit signal t by the distortion module 102—in accordance with a sequence of changes stored in the transmitter change key 112 as discussed above. As another example, the change module 110 of FIG. 5 can periodically change characteristics of the distortion module 102—and thus the distortion signal d that is combined with the transmit signal t by the signal combiner 512—in accordance with a sequence of changes stored in the transmitter change key 112 as discussed above. Moreover, in both the systems of FIG. 4 and FIG. 5, the change module 110 can change the characteristics of the distortion module 102 while the distortion module 102 is distorting the signal at the input 104 to produce the distorted version of that signal at the output 108.

At step 906, the distorted version of the transmit signal can be transmitted as an RF transmission. For example, as shown in FIG. 4 and discussed above, the transmitter 402 can transmit the distorted transmit signal t̂ as the RF transmission 426, and the transmitter 502 of FIG. 5 can transmit the distorted transmit signal td as the RF transmission 554. The transmission 426, 554 can be a CWJ transmission as discussed above.

The process 920 of FIG. 9B can be performed by the receiver 432 of FIG. 4 or the receiver 532 of FIG. 5.

At step 922, the process 920 can receive the RF transmission transmitted at step 906 of FIG. 9A. For example, the receiver 432 in FIG. 4 can receive the RF transmission 426, and the receiver 532 in FIG. 5 can receive the RF transmission 554 as discussed above.

At step 924, the process 920 can utilize a receiver change key that corresponds to the transmitter change key utilized at step 904 of FIG. 9A to remove the distortion from the received RF transmission. For example, as discussed above, the distortion removal module 442 and the change module 450 in the receiver 432 in FIG. 4 can utilize the change key 412 stored in the change module 450 to remove the distortion from the distorted received signal r̂. As another example, the signal separator 552 and the variable non-linear distorter 100' in the receiver 532 in FIG. 5 can utilize the receiver change key 511 stored in the change module 110' to remove the distortion from the distorted received signal rd as discussed above.

The processes 900 and 920 are examples only, and variations are contemplated. For example, some of the steps 902-906, 922, and 924 can be performed in a different order and/or simultaneously. As another example, one or more of the steps 902-906, 922, and 924 can be performed in accordance with any of the variations of the systems 400 and 500 of FIGS. 4 and 5 discussed above.

Figure 10A:
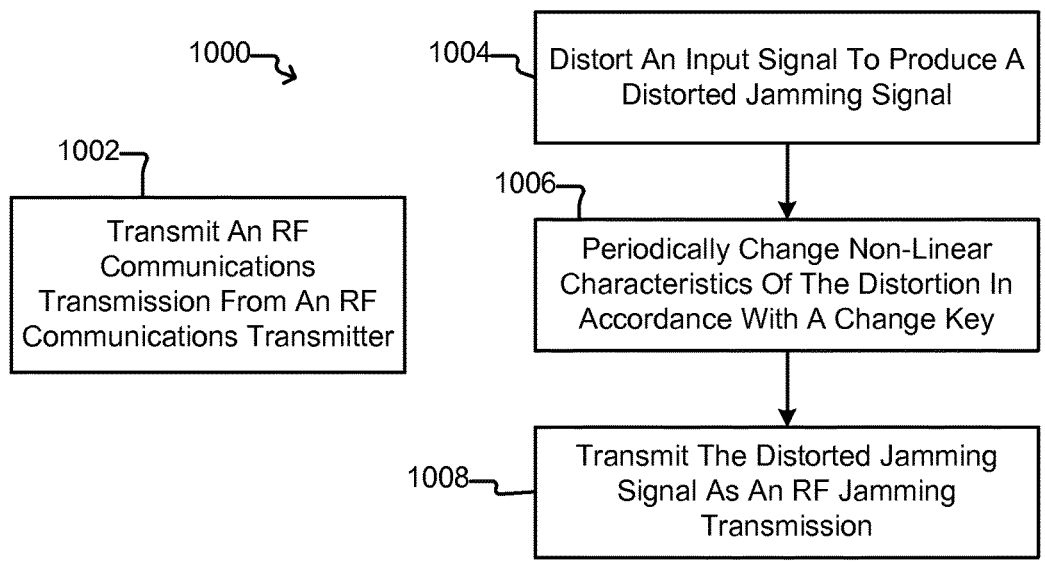
FIG. 10A is an example of a process that includes transmitting a communications signal and a jamming signal.
Figure 10B:
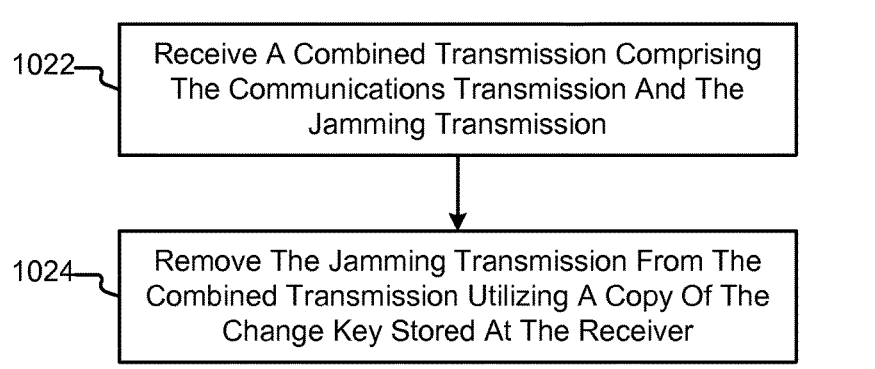
FIG. 10B shows an example of a process for receiving and decoding the combined communications signal and jamming signal according to some embodiments of the invention.

FIGS. 10A and 10B illustrate examples of processes 1000, 1020 for jamming transmission of an RF communications transmission so that only receivers with a copy of a change key can recognize and decode the communications transmission. Although the processes 1000, 1020 are not so limited, the systems of FIGS. 8A and 8B (including any modification or alternative illustrated or mentioned herein) can perform, respectively, the processes 1000, 1020.

The process 1000 of FIG. 10A can be performed by the communications transmitter 802 and the jamming transmitter 822 of FIG. 8A. As shown, at step 1002, the process 1000 can transmit an RF communications transmission. For example, the communications transmitter 802 of FIG. 8A can transmit the RF communications transmission 826 as discussed above. While the communications transmitter 802 is performing step 1002, the jamming transmitter 822 can perform steps 1004-1008. At step 1004, the distortion module 102 of FIG. 8A can distort the jamming input signal $j_i$ to produce the distorted jamming signal ĵ as discussed above. At step 1006, the change module 110 of FIG. 8A can periodically change characteristics of the distortion module 102—and thus the distortion imparted to the jamming input signal $j_i$—in accordance with a sequence of changes stored in the change key 112 as discussed above. Moreover, the change module 110 can do so while the distortion module 102 is distorting the jamming input signal $j_i$ to produce the distorted jamming signal ĵ. At step 1008, the jamming transmitter 822 can transmit the distorted jamming signal ĵ as the jamming transmission 836.

The process 1020 of FIG. 10B can be performed by the receiver 532 of FIG. 8B. At step 1022, the receiver 532 can receive a combined transmission 854, which can be a combination of the communications transmission 826 and the jamming transmission 836. At step 1024, the RF receiver 532 can utilize the same change key to remove the jamming transmission from the combined transmission received at step 1024 as the jamming transmitter 822 used to distort the jamming signal $j_i$. For example, the change key 511 utilized by the signal separator 522 and the variable non-linear distorter 100' in FIG. 8B can be the same as the change key 112 in the jamming transmitter 822.

The processes 1000, 1020 are examples only, and variations are contemplated. For example, some of the steps 1002-1008, 1022, 1024 can be performed in a different order and/or simultaneously. As another example, one or more of the steps 1002-1008, 1022, 1024 can be performed in accordance with any of the variations of the system of 8A and 8B discussed above.

Although specific embodiments and applications of the invention have been described in this specification, these embodiments and applications are exemplary only, and many variations are possible.

We claim:

1. A radio frequency (RF) communications system comprising an RF transmitter, the transmitter comprising:
    a transmit device configured to transmit an RF transmission;
    a transmit path to the transmit device;
    a distortion module configured to receive a transmit signal comprising a modulated carrier signal and to impart non-linear distortion to the transmit signal to produce a distorted version of the transmit signal, wherein the distortion module comprises an input for receiving an input signal and an output for outputting an output signal as a non-linear function of the input signal, the non-linear function comprising a plurality of terms that each have a variable that is one or both of raised to a power or a memory variable; and
    a change module configured to change periodically non-linear characteristics of the non-linear function of the distortion module in accordance with a transmitter change key, wherein changing the non-linear characteristics comprises changing one or more of an order of the non-linear function, a memory depth of the non-linear function, or one or more coefficients of the non-linear function.

2. The communications system of claim 1, wherein the transmitter change key is configured to change the non-linear characteristics of the distortion module sufficiently to produce the distorted version of the transmit signal as a communication while jamming (CWJ) signal:
    decodable by an RF receiver having a receiver change key that corresponds to the transmitter change key, and
    for jamming RF receivers that lack the RF receiver change key.

3. The communications system of claim 1, wherein:
    the non-linear function comprises a plurality of terms having a variable raised to a power, and wherein changing an order of the non-linear function comprises changing a coefficient of at least one of the terms from a zero value to a non-zero value or from a non-zero value to a zero value.

4. The communications system of claim 1, wherein:
    the non-linear function comprises a plurality of terms having a memory variable, and wherein changing a memory depth of the non-linear function comprises changing a coefficient of at least one of the terms from a zero value to a non-zero value or from a non-zero value to a zero value.

5. The communications system of claim 1, wherein:
the distortion module comprises a plurality of filters, and
the non-linear characteristics of the distortion module include non-linear characteristics of at least one of the filters.

6. The communications system of claim 5, wherein the filters are cascaded.

7. The communications system of claim 1, wherein:
the non-linear function is generated based on a non-parametric model.

8. The communications system of claim 1, wherein:
the distortion module is an element of the transmit path such that the input signal of the distortion module is the transmit signal and the output signal of the distortion module is the distorted version of the transmit signal.

9. The communications system of claim 1, wherein:
the input signal of the distortion module is different from the transmit signal; and the transmitter further comprises a first combiner disposed in the transmit path and configured to combine the output signal of the distortion module with the transmit signal to produce the distorted version of the transmit signal.

10. The communications system of claim 9, wherein:
the transmit signal is substantially in a frequency band, and
the transmitter further comprises a second combiner configured to:
combine the transmit signal from the transmit path with a signal comprising frequency components that are outside of the frequency band to produce a second combined signal, and
provide the second combined signal as the input signal of the distortion module.

11. The communications system of claim 1 further comprising an RF receiver, wherein:
the receiver comprises a digital memory device in which a receiver change key is stored, and
the receiver change key corresponds to the transmitter change key.

12. The communications system of claim 11, wherein the receiver change key is the same as or an inverse of the transmitter change key.

13. A radio frequency (RF) communications system comprising:
a communications transmitter configured to transmit an RF communications transmission; and
a jamming transmitter configured to transmit an RF jamming transmission, the jamming transmitter comprising:
a distortion module configured to impart non-linear distortion to an input signal comprising a modulated carrier signal a to produce a distorted jamming signal to be transmitted by the jamming transmitter as the jamming transmission, wherein the distortion module produces the distorted jamming signal as a non-linear function of the input signal, the non-linear function comprising a plurality of terms that each have a variable that is one or both of raised to a power or a memory variable; and
a change module configured to change periodically non-linear characteristics of the non-linear function in accordance with a jammer change key, wherein changing the non-linear characteristics comprises changing one or more of an order of the non-linear function, a memory depth of the non-linear function, or one or more coefficients of the non-linear function.

14. The communications system of claim 13, wherein:
the non-linear function comprises a plurality of terms having a variable raised to a power, and wherein changing an order of the non-linear function comprises changing a coefficient of at least one of the terms from a zero value to a non-zero value or from a non-zero value to a zero value.

15. The communications system of claim 13, wherein:
the non-linear function comprises a plurality of terms having a memory variable, and wherein changing a memory depth of the non-linear function comprises changing a coefficient of at least one of the terms from a zero value to a non-zero value or from a non-zero value to a zero value.

16. The communications system of claim 13, wherein:
the distortion module comprises a plurality of filters, and
the non-linear characteristics of the distortion module include non-linear characteristics of at least one of the filters.

17. The communications system of claim 16, wherein the filters are cascaded.

18. The communications system of claim 13, wherein:
the non-linear function is generated based on a non-parametric model.

19. The communications system of claim 13 further comprising an RF receiver, wherein:
the receiver comprises a digital memory device in which a receiver change key is stored, and
the receiver change key corresponds to the transmitter change key.

20. The communications system of claim 19, wherein the receiver change key is the same as or an inverse of the transmitter change key.

21. A communications process comprising:
imparting non-linear distortion to a transmit signal, comprising a modulated carrier signal, in a radio frequency (RF) transmitter to produce a distorted version of the transmit signal in the transmitter, wherein the non-linear distortion is imparted by generating an output signal as a non-linear function of an input signal, the non-linear function comprising a plurality of terms that each have a variable that is one or both of raised to a power or a memory variable;
while imparting the non-linear distortion to the transmit signal, periodically changing non-linear characteristics of the non-linear function in accordance with a transmitter change key stored at the transmitter, wherein changing the non-linear characteristics comprises changing one or more of an order of the non-linear function, a memory depth of the non-linear function, or one or more coefficients of the non-linear function; and
transmitting the distorted version of the transmit signal as an RF transmission from the transmitter.

22. The process of claim 21, wherein changing the non-linear characteristics of the non-linear function in accordance with the transmitter change key comprises changing the non-liner characteristics sufficiently to produce the distorted version of the transmit signal as a communication while jamming (CWJ) signal:
decodable by an RF receiver having a receiver change key that corresponds to the transmitter change key, and
for jamming RF receivers that lack the RF receiver change key.

23. The process of claim 21, wherein the input signal is the transmit signal such that the output signal is the distorted version of the transmit signal.

24. The process of claim 21, wherein:
the non-linear function comprises a plurality of terms having a variable raised to a power, and wherein changing an order of the non-linear function comprises changing a coefficient of at least one of the terms from a zero value to a non-zero value or from a non-zero value to a zero value.

25. The process of claim 23, wherein:
the non-linear function comprises a plurality of terms having a memory variable, and wherein changing a memory depth of the non-linear function comprises changing a coefficient of at least one of the terms from a zero value to a non-zero value or from a non-zero value to a zero value.

26. The process of claim 23, wherein the non-linear function comprises filtering functions.

27. The process of claim 21, wherein:
the output signal is combined with the transmit signal to produce the distorted version of the transmit signal.

28. The process of claim 27, wherein the input signal comprises components inside and outside of a frequency band of the transmit signal.

29. The process of claim 21 further comprising:
receiving the RF transmission at an RF receiver, and
removing the non-linear distortion from the RF transmission at the RF receiver utilizing a receiver change key at the RF receiver,
wherein the receiver change key is the same as the transmitter change key.

30. The process of claim 29, wherein:
imparting spreads the distorted version of the transmit signal over a frequency band and,
transmitting jams the frequency band with respect to receivers lacking the receiver change key.

31. A communications process comprising:
transmitting a radio frequency (RF) communications transmission from an RF communications transmitter;
imparting non-linear distortion to an input signal, comprising a modulated carrier signal, in an RF jamming transmitter to produce a distorted jamming signal in the jamming transmitter, wherein the non-linear distortion is imparted by generating an output signal as a non-linear function of the input signal, the non-linear function comprising a plurality of terms that each have a variable that is one or both of raised to a power or a memory variable;
while distorting the input signal to produce the distorted jamming signal, periodically changing non-linear characteristics of the non-linear function in accordance with a jamming change key stored at the jamming transmitter, wherein changing the non-linear characteristics comprises changing one or more of an order of the non-linear function, a memory depth of the non-linear function, or one or more coefficients of the non-linear function; and
transmitting the distorted jamming signal as an RF jamming transmission.

32. The process of claim 31, wherein;
the non-linear function comprises a plurality of terms having a variable raised to a power, and wherein changing an order of the non-linear function comprises changing a coefficient of at least one of the terms from a zero value to a non-zero value or from a non-zero value to a zero value.

33. The process of claim 31, wherein:
the non-linear function comprises a plurality of terms having a memory variable, and wherein changing a memory depth of the non-linear function comprises changing a coefficient of at least one of the terms from a zero value to a non-zero value or from a non-zero value to a zero value.

34. The process of claim 31, wherein:
the non-linear function comprises a plurality of terms having a memory variable, and wherein changing the non-linear characteristics comprises changing a structure of at least one memory variable.

35. The process of claim 31, wherein:
the non-linear function is implemented using a plurality of filters.

36. The process of claim 31, wherein the input signal comprises components inside and outside of a frequency band of the communications transmission.

37. The process of claim 31 further comprising:
receiving at an RF receiver a combined transmission comprising the communications transmission and the jamming transmission,
removing the jamming transmission from the combined transmission at the RF receiver utilizing a receiver change key stored at the RF receiver, and
the receiver change key corresponds to the jamming change key.

38. The process of claim 37, wherein the receiver change key is the same as or an inverse of the transmitter change key.

39. The process of claim 37, wherein:
imparting spreads the distorted jamming signal over a frequency band, and
transmitting the jamming transmission jams the frequency band with respect to receivers lacking the jamming change key.

* * * * *